United States Patent
Duerr

(10) Patent No.: US 11,519,810 B2
(45) Date of Patent: Dec. 6, 2022

(54) SYSTEM FOR DELIVERING LEAK DETECTION DYE WITH A RECLAIM/RECHARGE UNIT

(71) Applicant: Spectronics Corporation, Westbury, NY (US)

(72) Inventor: John Duerr, Massapequa Park, NY (US)

(73) Assignee: Spectronics Corporation, Melville, NY (US)

( * ) Notice: Subject to any disclaimer, the term of this patent is extended or adjusted under 35 U.S.C. 154(b) by 617 days.

(21) Appl. No.: 16/582,654

(22) Filed: Sep. 25, 2019

(65) Prior Publication Data

US 2020/0124493 A1 Apr. 23, 2020

Related U.S. Application Data

(60) Provisional application No. 62/747,432, filed on Oct. 18, 2018.

(51) Int. Cl.
*F25B 45/00* (2006.01)
*G01M 3/20* (2006.01)
*F25B 43/00* (2006.01)

(52) U.S. Cl.
CPC ............ *G01M 3/20* (2013.01); *F25B 43/003* (2013.01); *F25B 45/00* (2013.01); *F25B 2345/001* (2013.01); *F25B 2500/222* (2013.01)

(58) Field of Classification Search
CPC .. F25B 45/00; F25B 43/003; F25B 2345/001; F25B 2345/003; F25B 2500/222; G01M 3/20
See application file for complete search history.

(56) References Cited

U.S. PATENT DOCUMENTS

| | | |
|---|---|---|
| 5,167,140 A | 12/1992 | Cooper et al. |
| 5,440,919 A | 8/1995 | Cooper |
| 6,056,162 A | 5/2000 | Leighley |
| RE36,951 E | 11/2000 | Cooper et al. |
| 6,170,541 B1 * | 1/2001 | Sanhaji .............. B60H 1/00585 141/38 |

OTHER PUBLICATIONS

KONFORT 700 Series; www.texa.com; dated May 2019, 28 pages.
ROBINAIR Model AC1234-4, Recover, Recycle, Recharge Machine for R1234yf A/C System; Robinar.com, 60 pages.

* cited by examiner

*Primary Examiner* — Brian M King
(74) *Attorney, Agent, or Firm* — Faegre Drinker Biddle & Reath LLP

(57) ABSTRACT

A recovery and recharge apparatus and method for delivering a dose of fluorescent dye to an air conditioning/HVAC system. A supply line provides for both recovering and recharging of refrigerant into the system. The supply line includes a first segment connected to the recovery and recharge unit and having a single internal conduit for channeling reclaimed refrigerant into the recovery and recharge unit and for channeling refrigerant from the reservoir. A dye compartment is fluidly connected to the first segment and includes an interior cavity with an access panel for permitting access to the cavity for receiving a fluorescent dye material. A second segment is fluidly connected to the dye compartment and has an outlet port for connecting to a low side connection on the air conditioning/HVAC system. Preferably one way valves are located on opposite sides of the dye compartment and allow recovered refrigerant to bypass the dye compartment.

20 Claims, 2 Drawing Sheets

SYSTEM FOR DELIVERING LEAK DETECTION DYE WITH A RECLAIM/RECHARGE UNIT

RELATED APPLICATION

This application is related to and claims priority from U.S. Provisional Application No. 62/747,432, filed Oct. 18, 2018, the disclosure of which is incorporated herein by reference in its entirety.

FIELD OF THE INVENTION

This invention relates to leak detection systems for air conditioning systems and, more specifically, to a system for introducing small charges of leak detection fluid into a closed loop air conditioning system.

BACKGROUND

Leak detection dyes are used in air conditioning and HVAC systems to assist in the detection of the location of leaks, such as in hoses or joints. The most common leak detection dye is one that circulates with the system's refrigerant, typically added to the system by the OEM during manufacturing or later by service personnel during maintenance. In the event of leakage in the system, the dye escapes with the refrigerant at the leak site. When the service personnel inspecting the air conditioning components shines an appropriate light source, the dye fluoresces or "glows" thereby identifying the leak location.

In the past, oil has been added to the refrigerant to facilitate lubrication of the air conditioning components. The oil also helps with dispersing the dye in the refrigerant and provides a mechanism for the dye to "stick" to a leak location as it is vented out, thereby facilitating detection of the leak source.

In recent years, there has been a move to introduce different refrigerants that are less harmful to the environment and to reduce the amount or "charge" of oil in the air conditioning and HVAC systems in light of improvements in component efficiencies.

Specifically, the oil charges in the vehicles are becoming increasingly smaller as technology improves. In the past, an automotive air conditioning system would commonly operate with oil charges from 8-12 ounces. In such charges, the dose of leak detection dye is typically ⅛-¼ oz. representing a final percentage of dye in oil ranging from 1%-3% of the total oil charge. If the dye is formulated with quality materials these proportions are safe and will not alter any operating characteristics or service life of the system.

New system components have been recently introduced that require an oil charges as low as 2-5 ounces. As such, a ⅛-¼ oz. dose of dye would result in the dye load ranging from 2.5%-11.1% of the total oil charge. At these levels, even a dye formulated with the best of materials could cause system issues over time. The viscosity of the system oil, which is a critically controlled and carefully designed oil property, will easily become out-of-specification and the balance of performance additives within the oil will be significantly altered.

In addition, the recent introduction of R-1234yf refrigerant for air conditioning systems has made selection of a leak detection dye especially difficult. As part of the formulation process, the synthesis of an oil-based fluorescent dye (i.e., the addition of fluorescent dye concentrate to the oil) causes the viscosity of the final product to increase above that of the oil alone. This has not been an issue in the past as there has been a range of lower viscosity oils to choose from and the dye represented only a small proportion of the oil charge. Also, in older systems, a dye based on a low viscosity oil and used in small proportions will have little or no effect on the oil viscosity in the system being treated. In newer vehicles this is no longer the case. The recent introduction of R-1234yf refrigerant has led vehicle manufacturers to standardize on 42 cSt viscosity PAG oil for these new air conditioning systems. Unlike in the past, there are currently no similar PAG oils available that have a viscosity suitably less than 42 cSt that can be used synthesize with a fluorescent dye. Thus, the introduction of leak detection dyes will result in an overall viscosity that is higher than the 42 cSt oil standard and, if used in traditional amounts, the leak detection dyes will cause the system oil viscosity to increase well over the 1-2% allowable as per system designs.

One solution is to introduce smaller doses of leak detection dye. However, doing so is difficult to do during servicing. Displacement leak detection dye systems (i.e., systems where the service personnel manually inject dyes into the air conditioning system without refrigerant after the system has been recharged) make delivery of a small volume of dye into the system very difficult resulting in over delivery of dye. These displacement type injection systems are also notoriously messy, as they leave a large amount of dye in the volume between their service connections and the inner seal of access fittings. This represents a waste of a significant amount of dye, and can drip and spread causing difficult to clean messes and false leak indications. This dye residue also commonly sprays forcibly out of a connection as an injector is disconnected, resulting in concentrated dye blown out all over an engine compartment.

Some conventional reclaim and recharge refrigerant machines include a mechanism for dispensing fluorescent dye into A/C systems. One type of conventional unit is the Konfort 720R A/C Recharge machine sold by Texa S.p.a. These conventional machines use oil-based dyes and are restricted to dispensing in similar volumes as what is currently used. Their current configuration does not allow for topping off of R-1234yf refrigerant to recharge. In addition, many employ bottles of dye which are exposed to moisture which can result in the addition of moisture into AC systems that can cause hazardous conditions if used in electrically driven compressors.

A need, therefore, exists for an improved system for introducing small charges of leak detection fluid into a closed loop air conditioning system.

SUMMARY OF THE INVENTION

A recovery and recharge apparatus is disclosed for delivering a dose of fluorescent dye to an air conditioning/HVAC system. The apparatus includes a recovery and recharge unit which includes a power driven motor. A storage reservoir is connected to or communicates with the unit for storing and supplying a volume of refrigerant.

A supply line is provided for recovering and recharging refrigerant. The supply line includes a first segment with a first end connected to the recovery and recharge unit and a second end. The first segment has a single internal conduit extending from the first end to the second end, the internal conduit configured to channel reclaimed refrigerant into the recovery and recharge unit and for channeling refrigerant from the recovery and recharge unit or the reservoir.

A dye compartment has one end fluidly connected to the second end of the first segment and has a second end. The dye compartment included an interior cavity and an access panel for permitting access to the cavity. The access panel includes a seal for inhibiting air or liquids from seeping out of the cavity through the access panel. The cavity is configured to receive a fluorescent dye material. The dye compartment is configured to permit flow of refrigerant received from the second end of the first segment and mix the refrigerant with the fluorescent dye material in the interior.

A second segment has a first end fluidly connected to the dye compartment and an outlet port configured to connect to a low side connection on the air conditioning/HVAC system. The second segment has a single internal conduit extending from the first end to the outlet port. The internal conduit is configured to channel reclaimed refrigerant from the air conditioning/HVAC system and to channel a recharge of refrigerant to the air conditioning/HVAC system.

In one embodiment, the fluorescent dye material is a liquid fluorescent dye, a solid/dry fluorescent dye, a porous dye pellet or a phase-changing dye.

In one embodiment, the supply line includes third, fourth and fifth segments, each of the third fourth and fifth segments includes an internal conduit and first and second ends. The fourth segment has its second end connected to an inlet in the dye compartment, and the fifth segment has its first end connected to an outlet on the dye compartment. A one-way recharge valve is connected to the second end of the first segment, the first end of the third segment, and the first end of the fourth segment. The one-way recharge valve permits flow of recharge refrigerant from the first segment into the fourth segment and not the third segment, and permits flow of reclaimed refrigerant from the third segment into the first segment. A one-way reclaim valve is connected to the second end of the third segment, the second end of the fifth segment, and the first end of the second segment. The one-way reclaim valve permits flow of reclaimed refrigerant from the second segment into the third segment and not the fifth segment, and permits flow of recharged refrigerant from the fifth segment into the second segment.

In another embodiment, The supply line includes third, fourth and fifth segments, each of the third fourth and fifth segments includes an internal conduit and first and second ends. The fourth segment has its second end connected to an inlet in the dye compartment, and the fifth segment has its first end connected to an outlet on the dye compartment. The internal conduit of the first segment branches so as to connect to the first end of the third segment and the first end of the fourth segment. A one-way recharge valve prevents flow of recharged refrigerant from the first segment into the third segment, and permits flow of reclaimed refrigerant from the third segment into the first segment. The first end of the second segment branches so as to connect to the second end of the third segment and the second end of the fifth segment. A one-way reclaim valve prevents flow of reclaimed refrigerant from the second segment into the fifth segment, and permits flow of recharged refrigerant from the fifth segment into the second segment.

The dye compartment may be configured to receive a pre-filled, disposable cartridge of dye. The dye compartment may be configured to receive a dye laden carrier. Preferably the carrier is a wafer of felt material loaded with a dry fluorescent dye. In an embodiment, the carrier includes walls defining a cage-like structure with dry fluorescent dye caked on the walls.

In an embodiment, the dye compartment includes a bypass conduit. In this embodiment, the second end of the dye compartment includes a reclaim valve that is configured to permit flow of reclaimed refrigerant from the second segment along the bypass conduit and prevents flow into the interior cavity. A first end of the dye compartment includes a recharge valve that permits flow of recharging refrigerant into the interior cavity and prevents flow into the bypass conduit.

In one embodiment with manually controllable valves, the supply line includes third, fourth and fifth segments, where each of the third fourth and fifth segments has an internal conduit and first and second ends. The fourth segment has its second end connected to an inlet in the dye compartment, and the fifth segment has its first end connected to an outlet on the dye compartment. A first manually controllable valve is connected to the second end of the first segment, the first end of the third segment, and the first end of the fourth segment. The first manually controllable valve has a recharge state and a reclaim state where the valve is configured, when in the recharge state, to permit flow of recharge refrigerant from the first segment into the fourth segment and not the third segment, and when in the reclaim state, to permit flow of reclaimed refrigerant from the third segment into the first segment. A second manually controllable valve is connected to the second end of the third segment, the second end of the fifth segment, and the first end of the second segment. The second manually controllable valve has a recharge state and a reclaim state where the valve is configured, when in the recharge state, to permit flow of recharge refrigerant from the fifth segment into the second segment, and when in the reclaim state, to permit flow of reclaimed refrigerant from the second segment into the third segment and not the fifth segment.

A process for recovery and recharge of refrigerant in an air conditioning/HVAC system is also disclosed. The process uses any of the embodiments of the recovery and recharge disclosed above. The process involves connecting the second end of the second segment to a low pressure connection on the air conditioning/HVAC system, evacuating refrigerant from the air conditioning/HVAC system and channeling the refrigerant through the internal conduit of the second segment and the internal conduit of the first segment and into the reservoir in the recovery and recharge unit, adding a fluorescent dye into the interior cavity of the dye compartment, channeling refrigerant from the reservoir through the internal conduit of the first segment into the interior cavity of the dye compartment, and channeling a mixture of the refrigerant and the fluorescent dye from the dye compartment through the internal conduit of the second segment and through the low pressure connection into the air conditioning/HVAC system.

The foregoing and other features of the invention and advantages of the present invention will become more apparent in light of the following detailed description of the preferred embodiments, as illustrated in the accompanying figures. As will be realized, the invention is capable of modifications in various respects, all without departing from the invention. Accordingly, the drawings and the description are to be regarded as illustrative in nature, and not as restrictive

BRIEF DESCRIPTION OF THE DRAWINGS

For the purpose of illustrating the invention, there are shown in the drawings embodiments that are presently preferred; it being understood, however, that this invention is not limited to the precise arrangements and constructions particularly shown.

DESCRIPTION OF THE INVENTION

Figure 1:
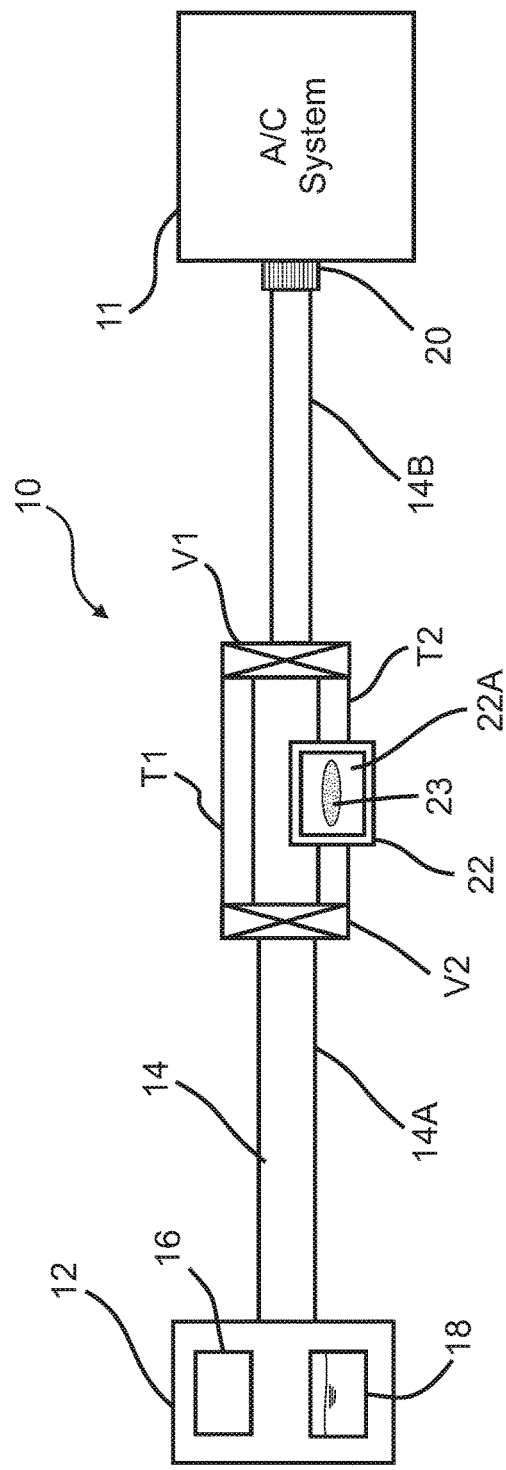
FIG. 1 is a schematic representation of a system according to an embodiment of the present invention for introducing a small charge of fluorescent dye into a closed loop air conditioning system.

Referring to FIG. 1, a system 10 for delivering an appropriate dose of fluorescent dye for a given cooling/HVAC configuration is schematically shown. The system includes a recovery and recharge unit 12 that is connected to an air conditioning (A/C) system 11 of a vehicle through a hose or supply line 14. The recovery and recharge units 12 that have recently been introduced and that meet specification SAE J2843 are designed to operate automatically to draw out existing refrigerant from the A/C system, conduct leakage tests on the system and then deliver a recharge of refrigerant when servicing of the A/C system is complete. The present invention contemplates use of a conventional recovery and recharge unit, such as the Recover, Recycle, Recharge Machine, Model AC1234-4 sold by Robinair, that would be modified to function as described herein. Conventional recovery and recharge units are well known to person's skilled in the art and include a motor connected to one or more reservoirs (either internal or external) for recovering and recharging refrigerant into an A/C system. The reclaim and recharge unit 12 has a pre-programmed procedure that cannot be interrupted to allow for the injection of any additives using refrigerant. The procedure is defined by the SAE J2843 specification R-1234yf [HFO-1234yf] Recovery/Recycling/Recharging Equipment for Flammable Refrigerants for Mobile Air-Conditioning Systems. Sections 7 and 9 of J2843 explain the recharge procedure and are incorporated herein by reference in their entireties.

As such, once initiated, there is no ability to add a leak detection dye to the reclaim recharge procedure using the reclaim and recharge unit itself. Similar standards are being adopted worldwide. These will all preclude the usage of any refrigerant driven dye injectors in R-1234yf vehicles. Furthermore, some states have rules regulating adding refrigerant to an AC system which is known to have leaks. As such it would not be possible to use a supplemental tank of refrigerant to add dye into a leaking system, even though the addition of refrigerant would be to detect and repair the leak.

The present invention addresses the problems associated with the new HVAC systems by providing a mechanism for delivering a preset amount of fluorescent dye using a conventional reclaim and recharge unit. This concept allows for the application of smaller doses of very highly concentrated dyes which can be sized to avoid altering lubricant properties, or the application of entirely oil-less dyes. It can be designed as an add-on to reclaim and recharge equipment operating in accordance with the J2843 procedures and environmental laws, or similar ones, without the problem of interrupting the charging process. It will use the refrigerant to cleanly propel a dye into the A/C system, eliminating mess and making dye addition much more convenient.

The reclaim and recharge unit 12 includes a power driven motor 16, and a storage container 18 for storing a volume of refrigerant. The supply line 14 functions both to reclaim the refrigerant and to supply a recharge flow of refrigerant. The supply line 14 includes an outlet port 20 that connects to the low side connection on the A/C system.

The supply line contains a dye compartment or chamber 22 for receiving a replaceable or refillable dye source or component 23. The dye source 23 can be a liquid fluorescent dye, solid/dry fluorescent dye, a porous pellet, such as the ones disclosed in U.S. patent application Ser. No. 15/624,224, filed Jun. 15, 2017 (the disclosure of which is incorporated herein by reference in its entirety), or a meltable dye, such as the one disclosed in U.S. Provisional Patent Application No. 62/883,711, filed on Aug. 7, 2019 (the disclosure of which is incorporated herein by reference in its entirety). The compartment 22 is located in-line with the recharge machine's low-side connection to the A/C system and designed to allow for the standard recharge procedure to operate, holding the dye until the recharge machine channels refrigerant into the A/C system for recharging.

In the liquid dye embodiment, the supply line 14 separates into a set of tubes T1, T2 that branch off from the main supply line 14A on one side of the dye compartment 22 and merge back into the main supply line 14B on the opposite side of the dye compartment 22. The tubes T1, T2 each preferably includes a check valve that operates opposite from the other, i.e., one check valve V1 allowing flow along the supply line tube T1 only from the A/C system (for recovery or evacuation), and the other check valve V2 only allowing flow along supply line tube T2 into the A/C system (for recharge). The dye compartment 22 is preferably is mounted on the supply line tube T2 that is controlled to only allow flow into the A/C system.

As shown in the figures, the values V1, V2 separate the supply line 14 into multiple segments, i.e., first and second main segments 14A, 14B, and branch segments (third segment T1, fourth segment T$2_A$ and fifth segment T$2_B$). Each segment includes an single internal conduit and first and second ends. The first valve V1 is connected to the second end of the first segment 14A, the first end of the third segment T1, and the first end of the fourth segment T$2_A$.

In an embodiment, the first valve has a recharge state and a reclaim state. In the recharge state, the first valve V1 is configured to permit flow of recharge refrigerant from the first segment 14A into the fourth segment T$2_A$ and not the third segment T1, and when in the reclaim state, to permit flow of reclaimed refrigerant from the third segment T1 into the first main segment 14A. The second valve V2 is connected to the second end of the third segment T1, the second end of the fifth segment T$2_B$, and the first end of the second segment 14B. The second valve also has a recharge state and a reclaim state. In the recharge state, the second valve V2 is configured to permit flow of recharge refrigerant from the fifth segment T$2_B$ into the second main segment 14B, and when in the reclaim state, to permit flow of reclaimed refrigerant from the second main segment 14B into the third segment T1 and not the fifth segment T$2_B$. The dye compartment 22 is located between the fourth segment T$2_A$ and the first segment T$2_B$. The valves V1 and V2 may be automatic one-way valves, such as check valves, that do not require external control such that the recharge and reclaim states are inherent in the valve construction (i.e., the valve permits flow in one direction and not the other). Alternately, the valves could be manually or electronically controlled valves. For electronic valves, the control could be provided by the unit 12 where signals are provided to the valves V1, V2 depending on the operational status of the reclaiming/recharging.

In the liquid dye embodiment, the dye compartment 22 includes an interior cavity 22A configured to store a volume of fluorescent dye 23, such as Fluoro-Lite® 5 sold by Tracer Products, Westbury, N.Y. and is designed to be refillable by injection or filling from an external source of bulk liquid dye. Alternately, the dye compartment 22 may be configured to receive a pre-filled, disposable cartridge 23 of dye that can be loaded into the interior cavity 22A of the dye compartment 22 with appropriate seals 21 to make sure that the refrigerant passes through the cartridge from one end of the interior cavity 22A to the other. A metering system (not shown), such as a positive-displacement pump, can be used to permit an appropriate amount of dye to mix with the refrigerant for the given A/C system and amount of refrigerant being channeled in.

During evacuation of the A/C system, valve V1 would divert flow of the refrigerant being reclaimed from the A/C system along supply line tube T1 (third segment) and prevent flow along supply line T2 (fifth segment $T2_B$), thus preventing flow into the dye compartment 22. When the vacuum decay test is completed and refrigerant is channeled to the A/C system (recharging), valve V2 will divert flow of the refrigerant along supply line tube T2 (fourth segment $T2_A$) and prevent flow along supply line tube T1 (third segment), thus channeling the flow through the dye compartment 22.

During the initial pressure test step where 15% of the refrigerant charge is sent to the A/C system for testing, the refrigerant will pass through the interior cavity 22A and wash part of the volume of fluorescent dye 23 into the vehicle. If the system passes the pressure test, the remaining 85% of the refrigerant will further wash fluorescent dye from the interior cavity 22A into the A/C system. If the A/C system fails the pressure test, the 15% refrigerant charge will be recovered normally. Since there would not be enough refrigerant from the 15% partial charge to remain in the A/C system 11 as a liquid, the vapor recovery would not wash out any significant amount of dye from the A/C system 11. Even if a small amount of dye were to be removed, it would be washed back into the vehicle when the final refrigerant charge is added.

In another embodiment (shown in FIG. 2) or as an optional modification or addition to the prior embodiment, a solid or porous dye pellet, a dry fluorescent dye or a phase changing meltable dye as described above can be used. In this embodiment, the supply line 14 includes a dye compartment or chamber 22 with an interior cavity 22A where a dye laden carrier 50 can be placed and the chamber sealed. The carrier 50 includes the dried volume of fluorescent dye, which is applied (loaded) onto the carrier 50 prior to it being placed in the chamber 22. In one embodiment, the carrier 50 is a wafer of felt material or a porous structure, such as an open cell foam-like structure or a cage that has sufficient surface area to hold dried fluorescent dye on its exposed surfaces and also have sufficient structural strength to withstand the pressure caused by the flow of refrigerant as it passes through the structure while minimizing flow resistance and back pressure.

Figure 2:
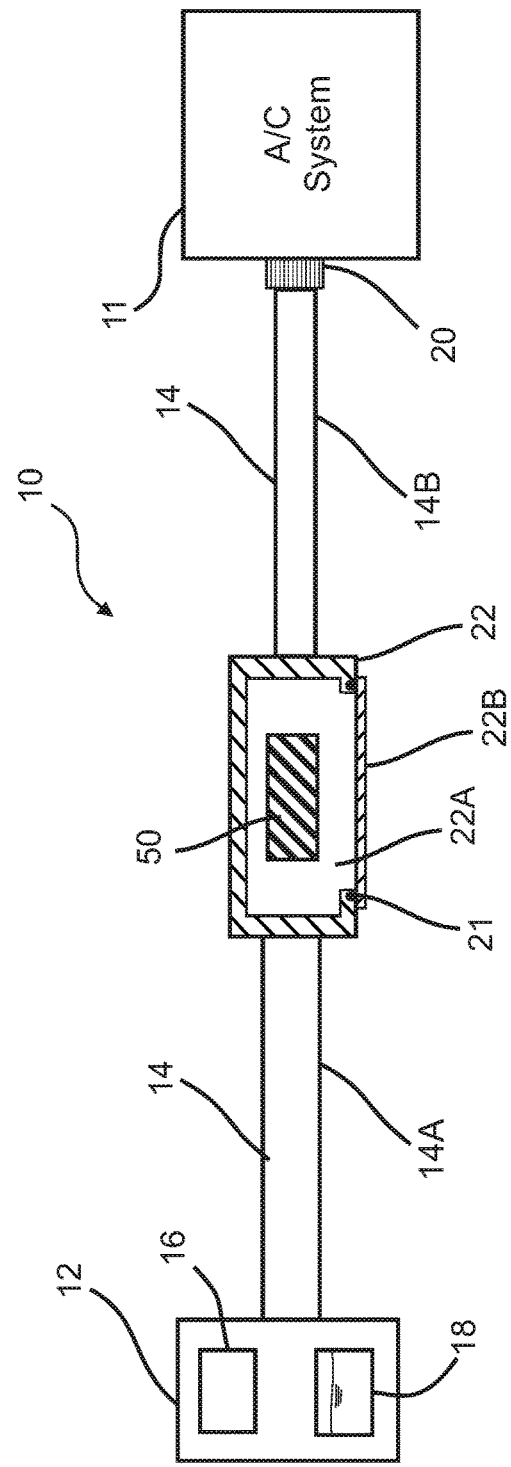
FIG. 2 is a schematic representation of an alternate embodiment of a system for introducing a small charge of fluorescent dye into a closed loop air conditioning system.

The carrier 50 is placed in the interior cavity 22A of the dye compartment 22 and the compartment is sealed (e.g., an access panel or door 22B on the dye compartment is closed so as to prevent leakage of refrigerant and entrance of air into the interior cavity 22A.) In the dry fluorescent dye embodiment, the supply line 14 does not need to be bifurcated since, due to the design of the R-1234yf recovery units, the evacuating fluid is in gaseous form and, as such, there will be no liquefied refrigerant present to cause dye to flow into the recovery/recharge machine during the vehicle evacuation stage of the recharge procedure. This is depicted in FIG. 2. As such, the dye in the wafer will remain unaffected during the evacuation process. Upon refrigerant charging, the liquid refrigerant used will then wet the dye on the carrier, dissolving it and washing it into the vehicle.

It is also contemplated that a liquid dye cartridge could be used in any of the embodiments and configured to supply the desired amount of dye into the dye compartment 22. In this embodiment, when the access panel 22B on the dye compartment 22 is opened to accept a dye cartridge, or liquid dye, it automatically seals the two supply line portions 14 so as to prevent air flowing into the supply lines. In this embodiment, the recovery unit operates as normal, but preferably prior to the 5-minute vacuum test an operator can open the dye compartment 22, place the dye in and close the chamber without affecting the vacuum level. Once the vacuum test is passed the dye will be injected with the 15% refrigerant dose. If this results in a recovery due to pressure decay the dye will still mostly remain in the system no matter what happens next, and it will be ready when the final refrigerant charge is added.

Figure 3:
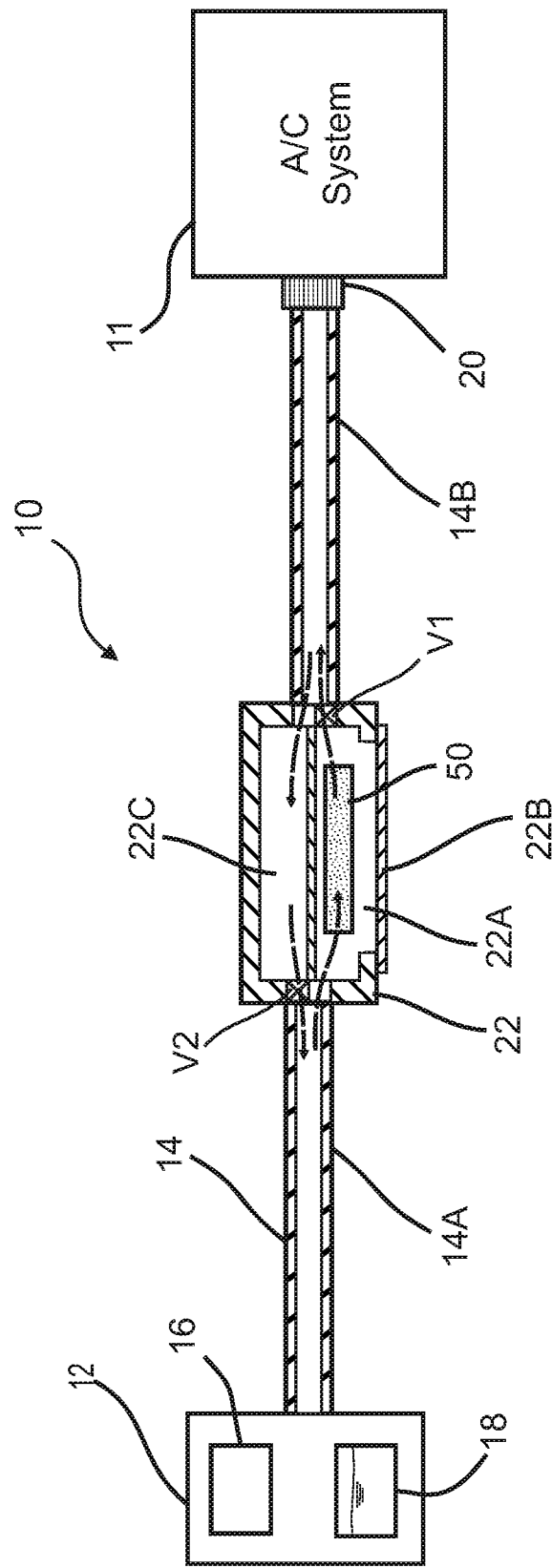
FIG. 3 is a schematic representation of another embodiment of a system for introducing a small charge of fluorescent dye into a closed loop air conditioning system.

FIG. 3 illustrates a further embodiment of the invention. In this embodiment, the dye compartment 22 includes the interior cavity 22A and a bypass channel or conduit 22C. The dye compartment 22 includes a first end or port connected to the first supply line segment 14A connected to the reclaim and recharge unit 12, and a second end or port connected to the second supply line segment 14B connected to the A/C system. The valves V1 and V2 are mounted in the second end or port and first end or port, respectively, to control flow through the bypass conduit 22A and the interior cavity 22A. Specifically, the first valve V1 diverts flow of the refrigerant being reclaimed from the A/C system along the bypass conduit 22C and prevents flow into the interior cavity 22A. When the vacuum decay test is completed and refrigerant is channeled to the A/C system (recharging), valve V2 diverts flow of the refrigerant into the interior cavity 22A and prevents flow into the bypass conduit 22C. By mounting the valves on or into the dye compartment 22 that includes a built in bypass conduit, two simple supply lines can be used. Although the illustrated embodiment shows a dye laden carrier 50, it is contemplated that, as discussed above, liquid dye or dye cartridges can be placed in the interior cavity 22A.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The particular implementations shown and described herein are illustrative examples of the invention and are not intended to otherwise limit the scope of the invention in any way. For the sake of brevity, conventional electronics, control systems and other functional aspects of the systems (and components of the individual operating components of the systems) may not be described in detail.

Finally, the steps of all methods described herein are performable in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the invention.

The invention claimed is:

1. A recovery and recharge apparatus for delivering a dose of fluorescent dye to an air conditioning/HVAC system, the apparatus comprising:
   a recovery and recharge unit, the unit including a power driven motor;
   a storage reservoir for storing a volume of refrigerant; and
   a supply line for recovering and recharging refrigerant, the supply line comprising:
      a first segment having a first end connected to the recovery and recharge unit and a second end, the first segment having a single internal conduit extending from the first end to the second end, the internal conduit configured to channel reclaimed refrigerant into the recovery and recharge unit and for channeling refrigerant from the recovery and recharge unit or the reservoir,
      a dye compartment having one end fluidly connected to the second end of the first segment and having a second end, the dye compartment including an interior cavity and an access panel for permitting access to the cavity, the access panel including a seal for inhibiting air or liquids from seeping out of the cavity through the access panel, the cavity configured to receive a fluorescent dye material, the dye compartment configured to permit flow of refrigerant received from the second end of the first segment and mix the refrigerant with the fluorescent dye material in the interior, and
      a second segment having a first end fluidly connected to the dye compartment and an outlet port configured to connect to a low side connection on the air conditioning/HVAC system, the second segment having a single internal conduit extending from the first end to the outlet port, the internal conduit configured to channel reclaimed refrigerant from the air conditioning/HVAC system and for channeling a recharge of refrigerant to the air conditioning/HVAC system.

2. The recovery and recharge apparatus of claim 1, wherein the fluorescent dye material is either a liquid fluorescent dye, a solid/dry fluorescent dye, a porous dye pellet or a phase-changing dye.

3. The recovery and recharge apparatus of claim 1, wherein the supply line includes third, fourth and fifth segments, each of the third, fourth and fifth segments includes an internal conduit and first and second ends, the fourth segment having its second end connected to an inlet in the dye compartment, and the fifth segment having its first end connected to an outlet on the dye compartment, and
   further comprising a one-way recharge valve connected to the second end of the first segment, the first end of the third segment, and the first end of the fourth segment, the one-way recharge valve permitting flow of recharge refrigerant from the first segment into the fourth segment and not the third segment, and permitting flow of reclaimed refrigerant from the third segment into the first segment, and a one-way reclaim valve connected to the second end of the third segment, the second end of the fifth segment, and the first end of the second segment, the one-way reclaim valve permitting flow of reclaimed refrigerant from the second segment into the third segment and not the fifth segment, and permitting flow of recharged refrigerant from the fifth segment into the second segment.

4. The recovery and recharge apparatus of claim 3, wherein the fluorescent dye material is either a liquid fluorescent dye, a solid/dry fluorescent dye, a porous dye pellet or a phase-changing dye.

5. The recovery and recharge apparatus of claim 3, wherein the dye compartment is configured to receive one of a pre-filled, disposable cartridge of dye, or a dye laden carrier.

6. The recovery and recharge apparatus of claim 3, wherein the dye compartment is configured to receive a dye laden carrier, the carrier being either a wafer of felt material loaded with a dry fluorescent dye, or a cage-like structure with dry fluorescent dye caked on the cage-like structure.

7. The recovery and recharge apparatus of claim 1, wherein the supply line includes third, fourth and fifth segments, each of the third, fourth and fifth segments includes an internal conduit and first and second ends, the fourth segment having its second end connected to an inlet in the dye compartment, and the fifth segment having its first end connected to an outlet on the dye compartment,
   wherein the internal conduit of the first segment branches so as to connect to the first end of the third segment and the first end of the fourth segment, and wherein a one-way recharge valve prevents flow of recharged refrigerant from the first segment into the third segment, and permits flow of reclaimed refrigerant from the third segment into the first segment, and
   wherein the first end of the second segment branches so as to connect to the second end of the third segment and the second end of the fifth segment, and wherein a one-way reclaim valve prevents flow of reclaimed refrigerant from the second segment into the fifth segment, and permits flow of recharged refrigerant from the fifth segment into the second segment.

8. The recovery and recharge apparatus of claim 7, wherein the fluorescent dye material is either a liquid fluorescent dye, a solid/dry fluorescent dye, a porous dye pellet or a phase-changing dye.

9. The recovery and recharge apparatus of claim 7, wherein the dye compartment is configured to receive one of a pre-filled, disposable cartridge of dye, or a dye laden carrier.

10. The recovery and recharge apparatus of claim 7, wherein the dye compartment is configured to receive a dye laden carrier, the carrier being either a wafer of felt material loaded with a dry fluorescent dye, or a cage-like structure with dry fluorescent dye caked on the cage-like structure.

11. The recovery and recharge apparatus of claim 1, wherein the dye compartment is configured to receive a pre-filled, disposable cartridge of dye.

12. The recovery and recharge apparatus of claim 1, wherein the dye compartment is configured to receive a dye laden carrier.

13. The recovery and recharge apparatus of claim 12, wherein the carrier is a wafer of felt material loaded with a dry fluorescent dye.

14. The recovery and recharge apparatus of claim 12, wherein the carrier includes walls defining a cage-like structure with dry fluorescent dye caked on the walls.

15. The recovery and recharge apparatus of claim 1, wherein the dye compartment includes a bypass conduit, and wherein the second end of the dye compartment includes a reclaim valve that is configured to permit flow of reclaimed refrigerant from the second segment along the bypass conduit and prevents flow into the interior cavity, and wherein the first end of the dye compartment includes a recharge valve that permits flow of recharging refrigerant into the interior cavity and prevents flow into the bypass conduit.

16. The recovery and recharge apparatus of claim 15, wherein the fluorescent dye material is either a liquid fluorescent dye, a solid/dry fluorescent dye, a porous dye pellet or a phase-changing dye.

17. The recovery and recharge apparatus of claim 15, wherein the dye compartment is configured to receive one of a pre-filled, disposable cartridge of dye, or a dye laden carrier.

18. The recovery and recharge apparatus of claim 15, wherein the dye compartment is configured to receive a dye laden carrier, the carrier being either a wafer of felt material loaded with a dry fluorescent dye, or a cage-like structure with dry fluorescent dye caked on the cage-like structure.

19. The recovery and recharge apparatus of claim 1, wherein the supply line includes third, fourth and fifth segments, each of the third, fourth and fifth segments includes an internal conduit and first and second ends, the fourth segment having its second end connected to an inlet in the dye compartment, and the fifth segment having its first end connected to an outlet on the dye compartment, and further comprising a first manually controllable valve connected to the second end of the first segment, the first end of the third segment, and the first end of the fourth segment, the first manually controllable valve having a recharge state and a reclaim state, the first manually controllable valve configured, when in the recharge state, to permit flow of recharge refrigerant from the first segment into the fourth segment and not the third segment, and when in the reclaim state, to permit flow of reclaimed refrigerant from the third segment into the first segment; and and a second manually controllable valve connected to the second end of the third segment, the second end of the fifth segment, and the first end of the second segment, the second manually controllable valve having a recharge state and a reclaim state, the second manually controllable valve configured, when in the recharge state, to permit flow of recharge refrigerant from the fifth segment into the second segment, and when in the reclaim state, to permit flow of reclaimed refrigerant from the second segment into the third segment and not the fifth segment.

20. A process for recovery and recharge of refrigerant in an air conditioning/HVAC system, the process comprising the step of:

providing a recovery and recharge apparatus of claim 1;

connecting the second end of the second segment to a low pressure connection on the air conditioning/HVAC system;

evacuating refrigerant from the air conditioning/HVAC system and channeling the refrigerant through the internal conduit of the second segment and the internal conduit of the first segment and into the reservoir in the recovery and recharge unit;

adding a fluorescent dye into the interior cavity of the dye compartment;

channeling refrigerant from the reservoir through the internal conduit of the first segment into the interior cavity of the dye compartment; and channeling a mixture of the refrigerant and the fluorescent dye from the dye compartment through the internal conduit of the second segment and through the low pressure connection into the air conditioning/HVAC system.

* * * * *